(12) United States Patent
Takahashi

(10) Patent No.: US 8,225,983 B2
(45) Date of Patent: Jul. 24, 2012

(54) JOINING JIG AND METHOD FOR MANUFACTURING A BONDED BODY OF DIFFERENT MEMBERS BY USING THE JIG

(75) Inventor: Hironori Takahashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 128 days.

(21) Appl. No.: 12/400,399

(22) Filed: Mar. 9, 2009

(65) Prior Publication Data

US 2009/0230176 A1 Sep. 17, 2009

(30) Foreign Application Priority Data

Mar. 13, 2008 (JP) .................................. 2008-064349

(51) Int. Cl.
*B23K 37/00* (2006.01)
(52) U.S. Cl. .................... 228/44.3; 228/245; 228/249
(58) Field of Classification Search .................. 228/245, 228/248.1, 249, 178, 182
See application file for complete search history.

(56) References Cited

U.S. PATENT DOCUMENTS

| | | | |
|---|---|---|---|
| 3,514,842 A | 6/1970 | Beuyukian et al. | |
| 5,964,020 A * | 10/1999 | Kragle et al. | 29/423 |
| 6,829,824 B2 * | 12/2004 | Reschnar et al. | 29/890.041 |
| 2004/0051196 A1 * | 3/2004 | Otsuka et al. | 264/41 |
| 2005/0118296 A1 | 6/2005 | Kaneko et al. | |
| 2006/0034972 A1 | 2/2006 | Takahashi et al. | |
| 2008/0078920 A1 | 4/2008 | Takahashi et al. | |
| 2008/0113858 A1 | 5/2008 | Kaneko et al. | |

FOREIGN PATENT DOCUMENTS

| | | |
|---|---|---|
| EP | 1 238 741 A1 | 9/2002 |
| JP | A-10-5992 | 1/1998 |
| JP | A-2000-326318 | 11/2000 |
| JP | 2001126952 A * | 5/2001 |
| JP | A-2003-285308 | 10/2003 |

OTHER PUBLICATIONS

Machine Translation of JP 2001-126952 Koizumi et al.*
U.S. Appl. No. 12/393,459, filed Feb. 26, 2009, in the name of Takahashi et al.

* cited by examiner

*Primary Examiner* — David R Sample
*Assistant Examiner* — Megha Mehta
(74) *Attorney, Agent, or Firm* — Oliff & Berridge, PLC

(57) ABSTRACT

A joining jig 5 is constituted of a pair of flat-plate sandwiching portions 17, 18 including sandwiching faces 15 which sandwich therebetween a plate member laminate 4 prepared by laminating two plate members 2, 3 with providing a solder on a joined face between the plate members. The joining jig has a plurality of vapor inflow ports provided in the sandwiching face 15 so that surplus solder vapor on the joined face flows into the vapor inflow ports in a case where the plate member laminate 4 is heated while sandwiching the plate member laminate between the pair; vapor flow paths provided so that the vapor flow paths communicate with the vapor inflow ports; and vapor discharge ports 42 provided in the side surface of the joining jig so that the vapor discharge ports communicate with the vapor flow paths to discharge the vapor of the solder to the outside.

10 Claims, 10 Drawing Sheets

JOINING JIG AND METHOD FOR MANUFACTURING A BONDED BODY OF DIFFERENT MEMBERS BY USING THE JIG

BACKGROUND OF THE INVENTION

1. Field of the Invention

The present invention relates to a joining jig and a method for manufacturing a bonded body of different members by using the jig. More particularly, it relates to a joining jig capable of precisely obtaining a bonded body of different members in which an unjoined region and a joined region in a joined face are intricately intertwined, for example, a die for use in a ceramic honeycomb structure forming mold when sophisticated forming properties are demanded, or another accurate bonded body of different members in which an unjoined region and a joined region in a joined face are intricately intertwined, and it also relates to a method for manufacturing a bonded body of different members by using the joining jig.

2. Description of the Related Art

In Patent Document 1, an Al metal joined article is disclosed in which an Al metal member made of aluminum (Al) or a metal containing Al as a main component is joined to a heterogeneous member made of a material different from that of the Al metal member. The joined article includes a soft metal layer having an Hv hardness of 20 to 80 (micro-Vickers; a load of 100 gf) and a thickness of 0.1 to 3 mm in a joined interface between the Al metal member and the different member.

In a case where such a bonded body of different members is manufactured, for example, a method is sometimes used which laminates two plate members made of different members, and then heats the laminated plate members while the members are sandwiched between a pair of joining jigs, to join the two laminated plate members to each other.

As a manufacturing method of a ceramic honeycomb structure, heretofore a method has broadly been used to perform extrusion-forming by using a honeycomb structure forming die including a die base member provided with back holes for introducing a forming material (a kneaded clay) and lattice-like slits or the like communicating with the back holes. In this die, one face of the die base member is usually provided with the lattice-like slits or the like each having a width corresponding to the thickness of each partition wall of the honeycomb structure, and the opposite face (the other face) thereof is provided with the back holes communicating with the slits and having large open areas. Moreover, the back holes are usually provided in positions corresponding to positions where the lattice-like slits or the like intersect with one another, and both the back holes and the slits communicate with one another in the die base member. Therefore, a forming material such as a ceramic material introduced from the back holes moves from the back hole having a comparatively large inner diameter to the slit having a small width, and the material is extruded as a formed article having a honeycomb structure (the formed honeycomb article) from the openings of the slits.

As such a die base member constituting the honeycomb structure forming die, for example, there is used a plate member made of one type of alloy such as a stainless steel alloy or a super hard alloy, or a plate member formed by joining two different types of plate members to each other, for example, a member to be provided with the slits and a member to be provided with the back hole (e.g., see Patent Document 2 or 3).

In a conventional manufacturing method of the honeycomb structure forming die, the slits and the back holes are formed in such a die base member by mechanical processing.

[Patent Document 1] JP-A-10-5992
[Patent Document 2] JP-A-2000-326318
[Patent Document 3] JP-A-2003-285308

However, in the conventional manufacturing method of the honeycomb structure forming die as the bonded body of different members in which the unjoined region and the joined region in the joined face are intricately intertwined, when the two different types of plate members are joined to each other to obtain the die base member, a solder is sometimes disposed between the plate members, and heated to join the two types of plate members to each other. However, for example, when one of the plate members is provided with back holes and groove portions communicating with the back holes and provided from a side surface along a joined face and this plate member is joined to the other plate member, the solder enters the back holes and the groove portions, and this solder remain in the back holes and the groove portions.

In consequence, there has been a problem that the solder in the back holes and the groove portions as a resistor breaks a tool such as a grindstone for processing the slits during the processing of the slits or that distortion is generated in the formed slits. Moreover, when the solder remains in the back holes and the groove portions in this manner and the honeycomb structure is formed, there is a problem that flow paths connecting the back holes and the groove portions to the slits are sometimes closed or narrowed by the solder, to adversely affect the quality of the formed article.

Moreover, as to a honeycomb structure having cells 14 separated from one another by partition walls 13 as shown in FIG. 28, in recent years, lightening, the thinning of the partition walls 13, a densified cell density and the like have been demanded to cope with a strict environmental standard. To meet this requirement, for example, in the above honeycomb structure forming die, the sizes and intervals of the back holes and the groove portions provided in the one plate member are decreased, and hence miniaturization and densification are demanded for both the unjoined region and the joined region more than ever. It is difficult to realize such accurate joining as to satisfy sufficient strength and durability.

SUMMARY OF THE INVENTION

The present invention has been developed in view of the above problem, and an object thereof is to provide a joining jig and a method for manufacturing a bonded body of different members by using the jig capable of precisely obtaining a bonded body of different members in which an unjoined region and a joined region in a joined face are intricately intertwined.

That is, according to the present invention, there are provided the following joining jig and the following method for manufacturing a bonded body of different members by using the joining jig.

[1] A joining jig comprising: a pair of flat-plate sandwiching portions including sandwiching faces which sandwich therebetween a plate member laminate prepared by laminating two plate members while a solder is arranged on a joined face between the plate members; a plurality of vapor inflow ports provided in the sandwiching face so that surplus solder vapor on the joined face flows into the vapor inflow ports in a case where the plate member laminate is heated while the plate member laminate is sandwiched between the pair of sandwiching portions; vapor flow paths provided so that the vapor flow paths communicate with the vapor inflow ports to constitute the flow paths of the vapor of the solder; and vapor discharge ports provided in the side surface of the joining jig so that the vapor discharge ports communicate with the vapor flow paths to discharge the vapor of the solder to the outside.

[2] The joining jig according to the above [1], wherein the vapor flow paths are provided so as to connect the adjacent vapor inflow ports to each other.

[3] The joining jig according to the above [1] or [2], wherein the plurality of vapor discharge ports are provided at intervals over the whole periphery of the side surface of one of the sandwiching portions.

[4] The joining jig according to any one of the above [1] to [3], wherein at least a part of the vapor flow paths are provided in a lattice-like shape in parallel with the sandwiching face.

[5] The joining jig according to any one of the above [1] to [4], wherein the vapor flow paths have widths of 0.05 to 50 mm and depths of 0.05 to 50 mm.

[6] The joining jig according to any one of the above [1] to [5], wherein when the plate member laminate is sandwiched between the pair of sandwiching portions, one of the two plate members have a plurality of back holes connecting the joined face to the plurality of vapor inflow ports, and in a case where the plate member laminate is heated while the plate member laminate is sandwiched between the pair of sandwiching portions, the surplus solder vapor on the joined face is allowed to flow into the vapor inflow ports, and is discharged from the plurality of vapor discharge ports through the vapor flow paths to obtain a bonded body of different members in which the two plate members are joined to each other.

[7] The joining jig according to the above [6], wherein the pair of sandwiching portions are made of a material having a thermal conductivity (W/m$^2$·K) 1.5 times or more as large as that of the one plate member.

[8] A manufacturing method of a bonded body of different members, comprising the steps of: sandwiching the plate member laminate between the sandwiching faces of the joining jig according to the above [6] or [7] so that the plurality of back holes communicate with at least a part of the plurality of vapor inflow ports; heating the plate member laminate to a temperature at which the solder melts or a higher temperature; decreasing the pressure of a heating atmosphere to a pressure lower than the vapor pressure of the solder to allow the surplus solder vapor on the joined face to flow into the vapor inflow ports from the back holes; and discharging the vapor from the vapor discharge ports through the vapor flow paths to obtain the bonded body of different members in which the two plate members are joined to each other.

[9] The manufacturing method of the bonded body of different members according to the above [8], wherein the one plate member constituting the bonded body of different members has groove portions communicating with the back holes as introduction holes of a kneaded forming clay and provided along the joined face in a lattice-like shape, the other plate member constituting the bonded body of different members is provided with slits to form a forming material into a lattice-like shape, the slits being formed into a lattice-like shape so as to communicate with the groove portions, and the bonded body of different members in which the two plate members are joined to each other is manufactured as a die to form a honeycomb structure.

The joining jig and the method for manufacturing the bonded body of different members by using the joining jig of the present invention are preferably used when manufacturing a bonded body of different members in which an unjoined region and a joined region in a joined face where the two plate members are joined to each other are intricately intertwined, for example, a bonded body of different members such as a die for use in a ceramic honeycomb structure forming mold. When the die obtained by this method for manufacturing the bonded body of different members is used as the ceramic honeycomb structure mold, in addition to sufficient strength and durability, sophisticated forming properties can be realized.

In particular, according to the joining jig of the present invention and the method for manufacturing the bonded body of different members by using the joining jig, the joining jig is provided with a mechanism for discharging the vapor of the solder during the manufacturing of the bonded body of different members having the joined article in which the unjoined region and the joined region are intricately intertwined, so that the remaining vapor of the solder can be prevented. In consequence, it is possible to very precisely obtain a bonded body of different members such as the die for use in the mold for forming the ceramic honeycomb structure having a large bore diameter and a high cell density.

DESCRIPTION OF REFERENCE NUMERALS

1: BONDED BODY OF DIFFERENT MEMBERS
2: PLATE MEMBER (ONE PLATE MEMBER)
3: PLATE MEMBER (OTHER PLATE MEMBER)
4: PLATE MEMBER LAMINATE
5: JOINING JIG (PAIR OF SANDWICHING PORTION)
6: FIXED PORTION
7: HEATER
8: RELEASE MATERIAL
9: JOINING JIG
10: RADIANT HEAT
11: OPENING
12: HONEYCOMB STRUCTURE
13: PARTITION WALL
14: CELL
15: SANDWICHING FACE
16: INSULATING CONTAINER
17: ONE SANDWICHING PORTION
18: OTHER SANDWICHING PORTION
19: VACUUM CONTAINER
21: DIE
25: SLIT
26: BACK HOLE
27: SOLDER
28: JOINED FACE
31: UNJOINED REGION
32: JOINED REGION
37: GROOVE PORTION
38: UNJOINED REGION
39: UNJOINED REGION
40: VAPOR FLOW PATH
41: VAPOR INFLOW PORT
42: VAPOR DISCHARGE PORT

DESCRIPTION OF THE PREFERRED EMBODIMENT

Hereinafter, embodiments of a joining jig of the present invention and a method for manufacturing a bonded body of different members by using the joining jig will be described in detail with reference to the drawings, but the present invention is not limited to the embodiments when interpreted, and can variously be changed, modified or improved based on the knowledge of any person skilled in the art without departing from the scope of the present invention.

Figure 1:
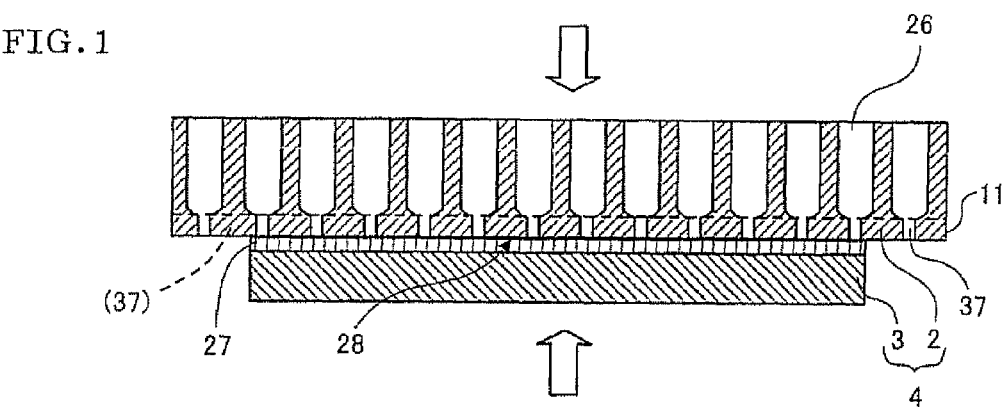
FIG. 1 is a schematic sectional view vertical to the surface of a plate member laminate viewed from the side thereof, schematically showing a step of manufacturing the plate member laminate.
Figure 2:
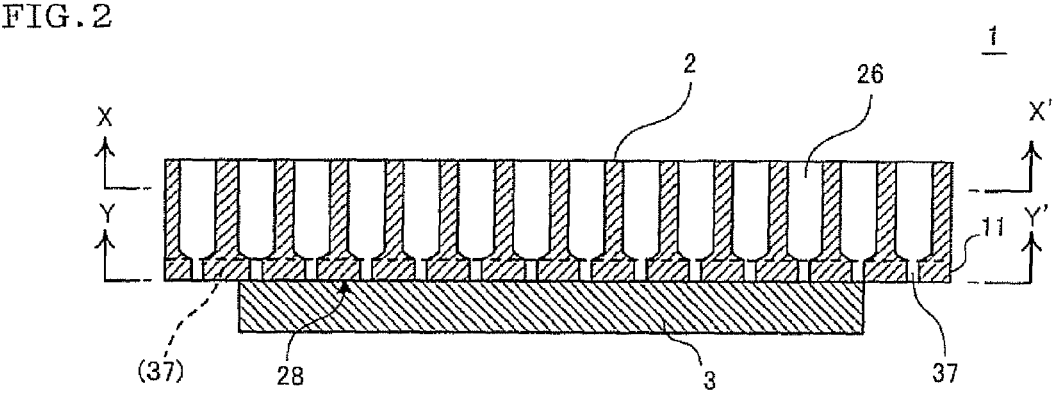
FIG. 2 is a schematic sectional view vertical to the surface of a bonded body of different members viewed from the side thereof, showing the bonded body of different members obtained by using one embodiment of a joining jig of the present invention.
Figure 3:
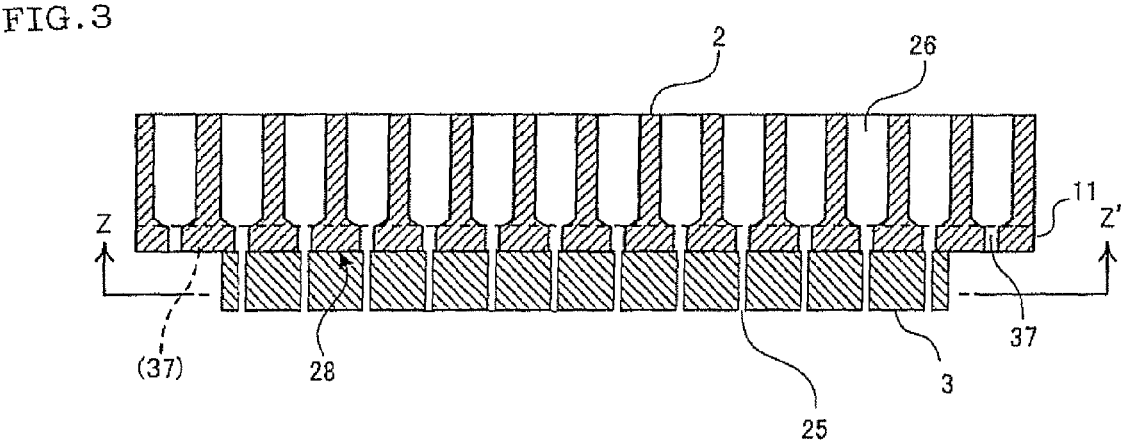
FIG. 3 is a schematic sectional view vertical to the surface of the plate member laminate, schematically explaining a step of forming slits in the other plate member of the bonded body of different members obtained as a die by using the embodiment of the joining jig of the present invention.
Figure 4:
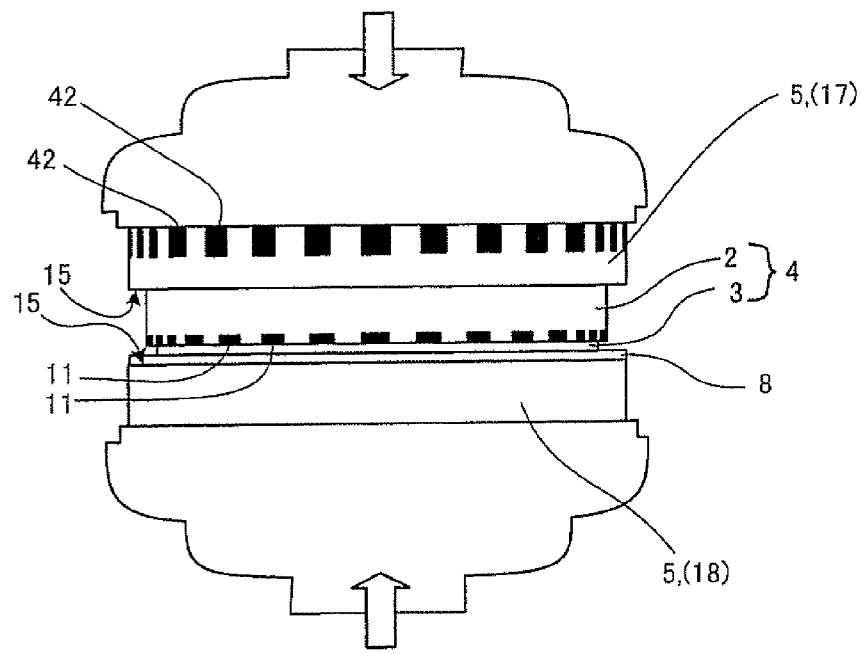
FIG. 4 is a schematic explanatory view schematically showing that the plate member laminate is sandwiched between the joining jigs in a method for manufacturing the bonded body of different members by using the embodiment of the joining jig of the present invention.
Figure 5:
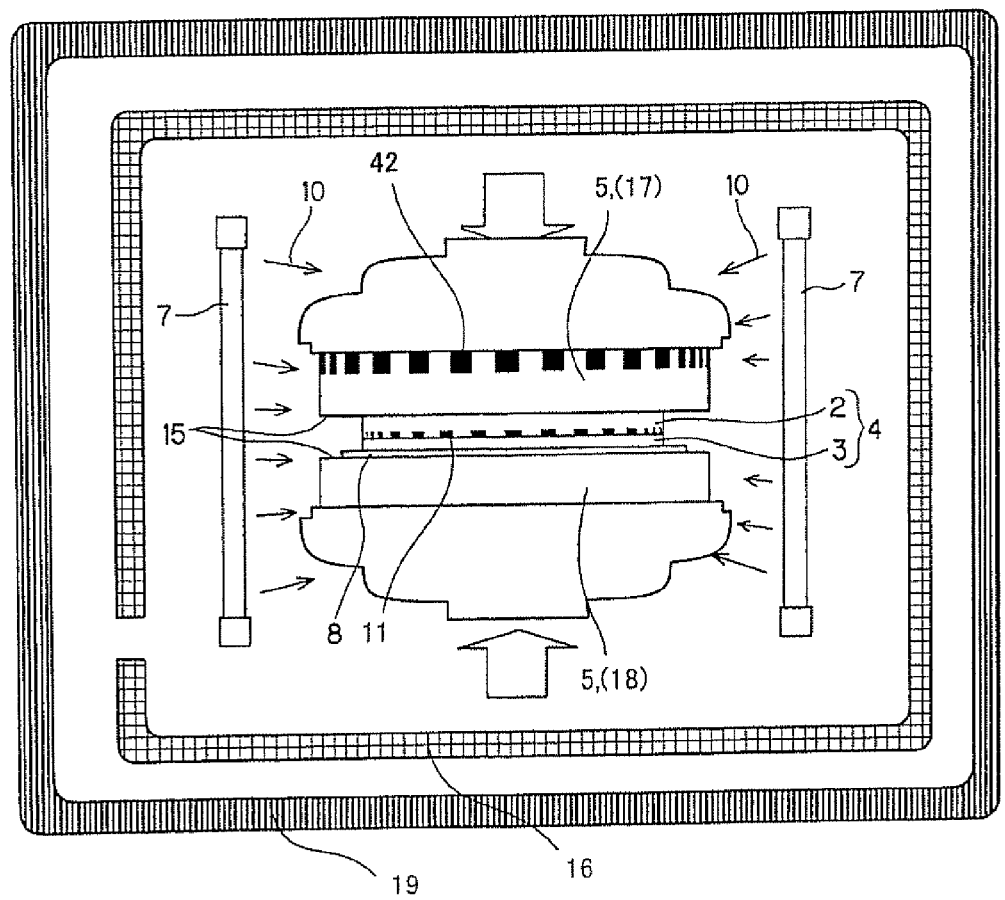
FIG. 5 is a schematic explanatory view schematically showing a step of heating the plate member laminate sandwiched between the joining jigs in a vacuum container in the method for manufacturing the bonded body of different members by using the embodiment of the joining jig of the present invention.

FIG. 1 is a schematic sectional view vertical to the surface of a plate member laminate viewed from the side thereof, schematically showing a step of manufacturing the plate member laminate. FIG. 2 is a schematic sectional view vertical to the surface of a bonded body of different members viewed from the side thereof, showing the bonded body of different members obtained by using one embodiment of a joining jig of the present invention. Furthermore, FIG. 3 is a schematic sectional view vertical to the surface of the plate member laminate, schematically explaining a step of forming slits in the other plate member of the bonded body of different members obtained by using the embodiment of the joining jig of the present invention. Moreover, FIG. 4 is a schematic explanatory view schematically showing that the plate member laminate is sandwiched between the joining jigs in a method for manufacturing the bonded body of different members by using the embodiment of the joining jig of the present invention. FIG. 5 is a schematic explanatory view schematically showing a step of heating the plate member laminate sandwiched between the joining jigs in a vacuum container in the method for manufacturing the bonded body of different members by using the embodiment of the joining jig of the present invention.

Figure 6:
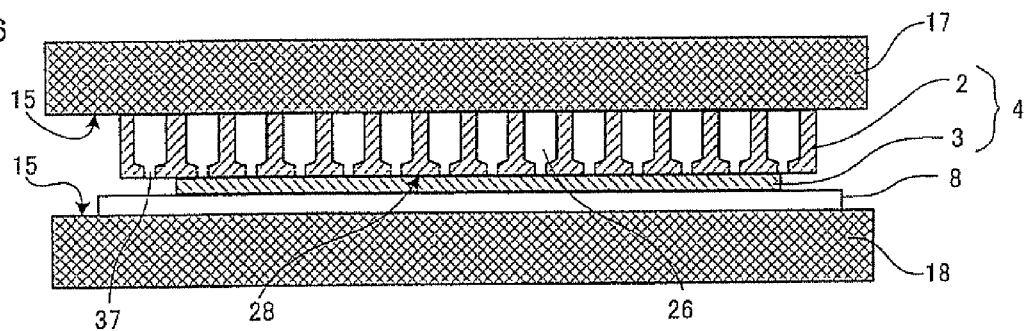
FIG. 6 is an explanatory view of a method for manufacturing the bonded body of different members by using a conventional joining jig, and is a schematic sectional view vertical to the surface of the plate member laminate viewed from the side of the plate member laminate sandwiched between sandwiching portions.
Figure 7:
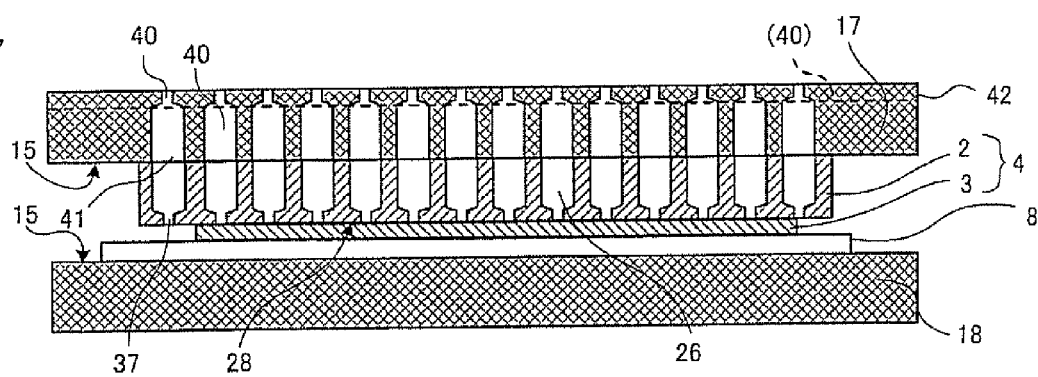
FIG. 7 is an explanatory view of the method for manufacturing the bonded body of different members by using one embodiment of the joining jig of the present invention, and is a schematic sectional view vertical to the surface of the plate member laminate viewed from the side of the plate member laminate sandwiched between sandwiching portions.

FIG. 6 is an explanatory view of a method for manufacturing a bonded body of different members by using a conventional joining jig, and is a schematic sectional view vertical to the surface of the plate member laminate viewed from the side of the plate member laminate sandwiched between sandwiching portions. FIG. 7 is an explanatory view of the method for manufacturing the bonded body of different members by using one embodiment of the joining jig of the present invention, and is a schematic sectional view vertical to the surface of the plate member laminate viewed from the side of the plate member laminate sandwiched between sandwiching portions. As illustrated above, the joining jig of the present invention is provided with a mechanism which has not been provided in a conventional joining jig and which is provided to discharge surplus solder vapor from a joined face 28, when the solder is heated during joining by the joining jig of the present invention.

Figure 8:
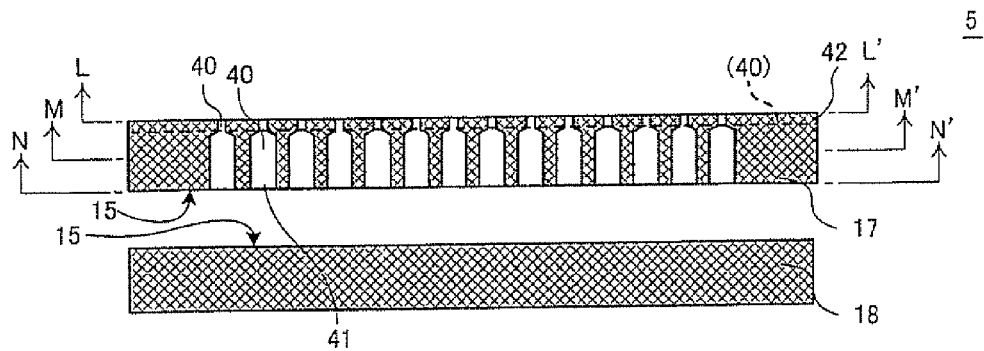
FIG. 8 is a schematic sectional view vertical to the surface of the plate member laminate viewed from the side surface thereof, showing one embodiment of the joining jig of the present invention.

The joining jig of the present invention is constituted of a pair of flat-plate sandwiching portions 5 including sandwiching faces 15 which sandwich therebetween a plate member laminate 4 as shown in FIG. 4. The laminate is prepared by laminating two plate members 2, 3 while a solder 27 is arranged on the joined face 28 between the plate members as shown in FIG. 1. As shown in FIG. 7, the joining jig of the present invention is further provided with a plurality of vapor inflow ports 41 provided in a sandwiching face 15 so that surplus solder vapor on the joined face 28 flows into the vapor inflow ports in a case where the plate member laminate 4 is heated while the laminate is sandwiched between the pair of sandwiching portions 5; vapor flow paths 40 provided so that the vapor flow paths 40 communicate with the vapor inflow ports 41 to form the flow paths of the vapor of the solder; and vapor discharge ports 42 provided in the side surface of the joining jig so that the vapor discharge ports communicate with the vapor flow paths 40 to discharge the vapor of the solder to the outside as shown in FIG. 4. FIG. 8 is a schematic sectional view vertical to the surface of the plate member laminate viewed from the side surface thereof, showing one embodiment of the joining jig of the present invention.

Figure 10:
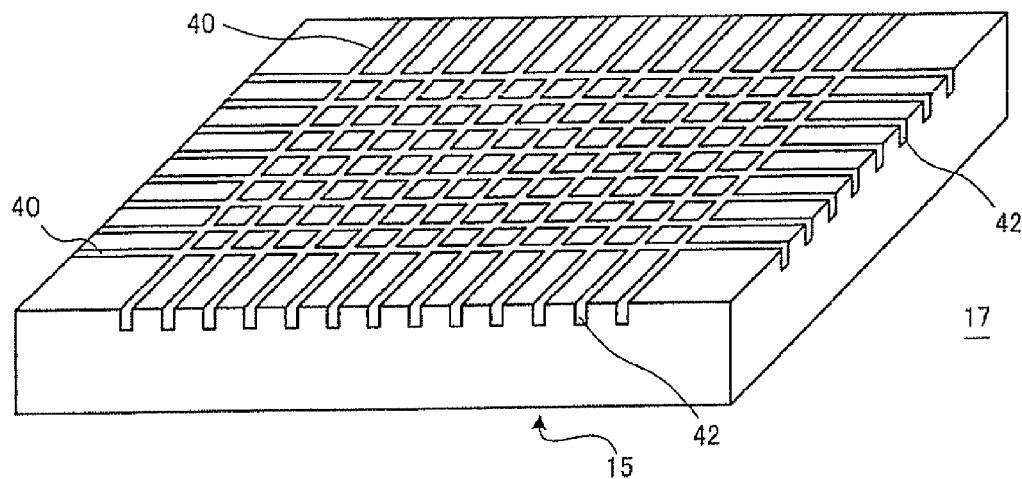
FIG. 10 is a schematic perspective view of one sandwiching portion in the embodiment of the joining jig of the present invention in a state in which a sandwiching face is a lower face.
Figure 11:
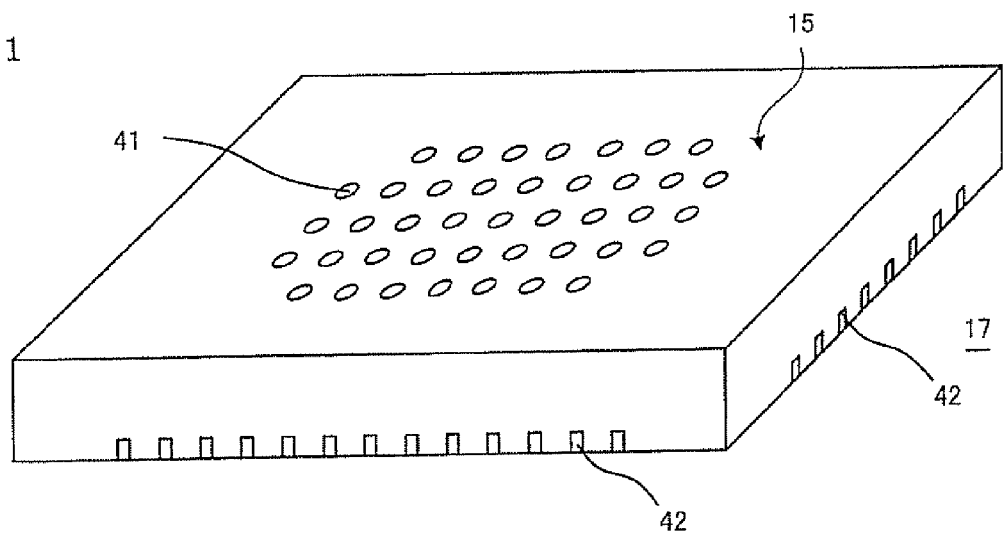
FIG. 11 is a schematic perspective view of the one sandwiching portion in the embodiment of the joining jig of the present invention in a state in which the sandwiching face is an upper face.
Figure 12:
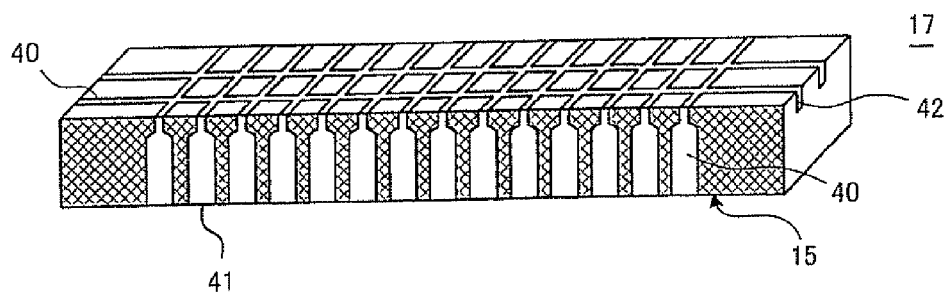
FIG. 12 is a partially cut perspective view of the one sandwiching portion in the embodiment of the joining jig of the present invention in a state in which the sandwiching face is the lower face.
Figure 13:
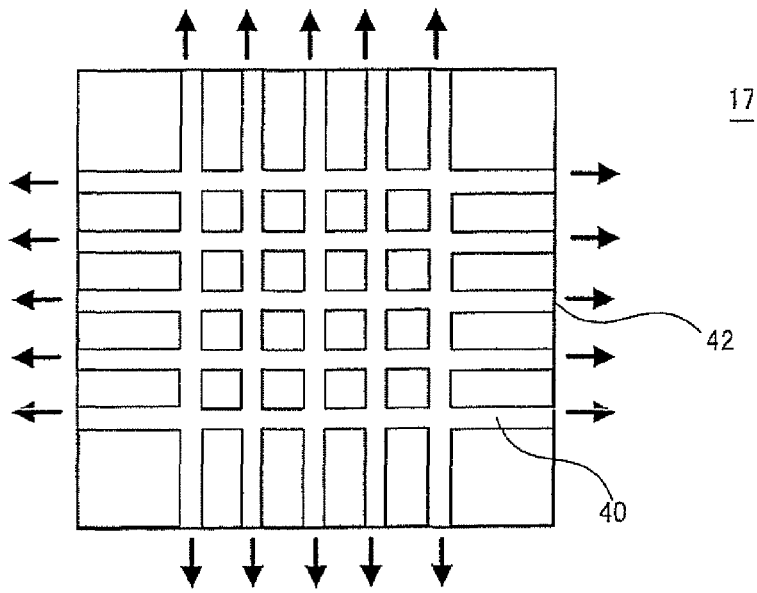
FIG. 13 is a schematic sectional view cut along the L-L' line of FIG. 8, showing the one sandwiching portion in the embodiment of the joining jig of the present invention.
Figure 14:
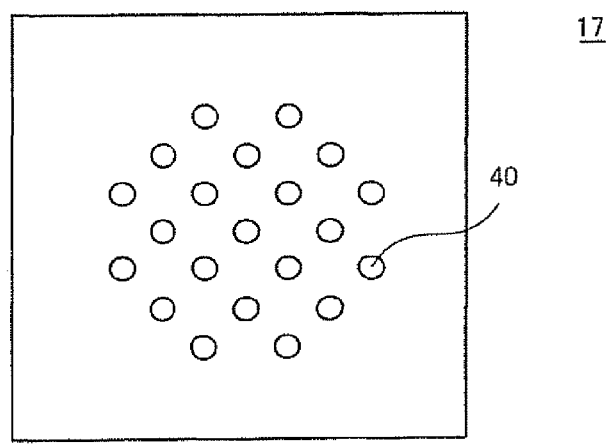
FIG. 14 is a schematic sectional view cut along the M-M' line of FIG. 8, showing the one sandwiching portion in the embodiment of the joining jig of the present invention.
Figure 15:
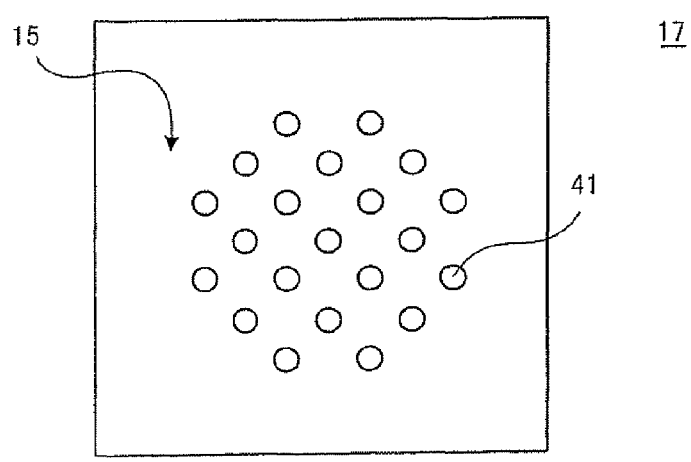
FIG. 15 is a schematic sectional view cut along the N-N' line of FIG. 8, showing the one sandwiching portion in the embodiment of the joining jig of the present invention.

FIG. 10 is a schematic perspective view of one sandwiching portion 17 constituting the joining jig in the embodiment of the joining jig of the present invention in a state in which a sandwiching face 15 is a lower face. Moreover, FIG. 11 is a schematic perspective view of the one sandwiching portion 17 in a state in which the sandwiching face 15 is an upper face. Furthermore, FIG. 12 is a partially broken perspective view of this one sandwiching portion 17 in a state in which the sandwiching face 15 is the lower face. It is to be noted that FIGS. 13, 14 and 15 show a schematic sectional view cut along the line L-L' of the one sandwiching portion 17 shown in FIG. 8, a schematic sectional view cut along the line M-M' thereof, and a schematic sectional view cut along the line N-N' thereof. The sandwiching portion 17 constituting the joining jig of the present invention preferably has a thickness of 1 to 100 mm. As shown in FIGS. 11 and 15, the sandwiching face 15 is provided with the plurality of vapor inflow ports 41. As shown in FIG. 7, when the plate member laminate 4 is sandwiched between the sandwiching faces 15 of the sandwiching portion 17 and a sandwiching portion 18, back holes 26 provided in the one plate member 2 communicate with the vapor inflow ports 41 provided in the sandwiching face 15 of the sandwiching portion 17. Therefore, the vapor of the solder can be allowed to flow into the vapor inflow ports 41 from the back holes 26.

It is to be noted that the plate member laminate does not have to be sandwiched so that the vapor inflow ports 41 correctly match the back holes 26, and a noticeable effect can be produced even if the back holes 26 partially come in contact with the vapor inflow ports 41. In consequence, when the vapor inflow ports 41 having diameters larger than those of the back holes 26 are provided at predetermined intervals in the sandwiching face as shown in FIG. 15, the joining jig 5 can effectively be used irrespective of the sizes or intervals of the back holes 26 or the total number of the back holes. However, the sandwiching face 15 needs to efficiently conduct heat during the joining to the joined face, and the sandwiching portion also performs a function of a pressurizing face for pressurizing the plate member laminate in arrow directions shown in FIG. 4. Therefore, the area of each vapor inflow port is preferably set to a range of 10 to 60% of the area of each back hole in accordance with a target to be joined.

As shown in FIG. 12, the vapor inflow ports 41 communicate with the vapor flow paths 40 provided in the sandwiching portion, and further the vapor flow paths 40 reach a side opposite to the sandwiching face 15. There is not any special restriction on the hole diameters of the vapor inflow ports, but the diameters are preferably in a range of 1.0 to 50 mm. As shown in FIG. 10, the vapor flow paths 40 reaching the side opposite to the sandwiching face 15 are formed in a lattice-like shape parallel to the sandwiching face. The lattice-like vapor flow paths 40 are easily formed by cutting, into a groove-like shape, the surface of the sandwiching portion 17 on the side opposite to the sandwiching face 15. Moreover, the vapor flow paths 40 communicate with the vapor discharge ports 42 over the whole periphery of the side surface of the sandwiching portion 17. When the vapor flow paths 40 are provided in the lattice-like shape parallel to the sandwiching face as shown in FIG. 10, the vapor of the solder can efficiently be discharged. Additionally, this is preferable from the viewpoint of thermal conduction efficiency during the heating or from the viewpoint that the joined face is equally pressurized when pressurized in the arrow directions shown in FIG. 4. Moreover, as shown in FIG. 10, the vapor discharge ports 42 are preferably provided over the whole periphery of the side surface of the sandwiching portion, so that the vapor of the solder can efficiently be discharged to the outside as shown by arrows of FIG. 13. There is not any special restriction on the dimensions of the vapor discharge ports 42, but the sizes of the vapor discharge ports are preferably equal to those of the flow paths, and the dimensions are preferably set to a width range of 0.05 to 50 mm and a depth range of 0.05 to 50 mm.

As a method of forming the lattice-like vapor flow paths 40, a heretofore known method such as grind processing by a diamond grindstone or discharge processing (EDM processing) is preferably usable. Moreover, it is preferable to set the depths of the lattice-like vapor flow paths 40 to a range of 0.5 to 50 mm and to set the widths thereof to a range of 0.5 to 50 mm and to set lattice intervals to a range of 1.0 to 50 mm because the vapor of the solder can efficiently be discharged and from the viewpoint of the thermal conduction efficiency during the heating or the viewpoint that the joined face can more equally be pressurized when pressurized in the arrow directions shown in FIG. 4.

Moreover, an angle at which this lattice-like vapor flow paths 40 intersect with each other does not have to be 90 degrees, and is preferably in a range of 45° to 90°. Moreover, the lattice-like vapor flow paths 40 may intersect with one another at an angle of 60 degrees from three directions.

However, the lattice-like vapor flow paths 40 necessarily do not have to be formed in a groove-like shape in the surface of the sandwiching face 15, and may extend through the sandwiching portion 17, and the vapor discharge ports 42 may be disposed in any portions as long as they are disposed in the side surface of the sandwiching portion 17. There is not any special restriction on the sectional shape of each lattice-like vapor flow path.

When the lattice-like vapor flow paths 40 are formed in the groove-like shape in the sandwiching face 15, the vapor flow paths 40 at this time preferably have a width in a range of 0.05 to 50 mm and a depth in a range of 0.05 to 50 mm. It is to be noted that when "the widths of the vapor flow paths" and "the depths of the vapor flow paths" are mentioned in the present specification, the dimensions of "the widths" and "the depths" of the groove-like vapor flow paths provided in the lattice-like shape are indicated in a case where as to at least a part of the vapor flow paths, the groove-like vapor flow paths are provided in the lattice-like shape on the sandwiching face or a plane parallel to the sandwiching face.

When the lattice-like vapor flow paths 40 are formed in the groove-like shape in the sandwiching face 15, the vapor flow paths at this time preferably have sectional areas of 0.1 to 100 mm$^2$. It is to be noted that when "the sectional areas of the vapor flow paths" are mentioned in the present specification, the dimensions of "the sectional area (the width×the depth)" in the section of each groove-like vapor flow path provided in the lattice-like shape, the section being vertical to a vapor flowing direction, are indicated in a case where as to at least a part of the vapor flow paths, the groove-like vapor flow paths are provided in the lattice-like shape on the sandwiching face or the plane parallel to the sandwiching face.

Figure 16:
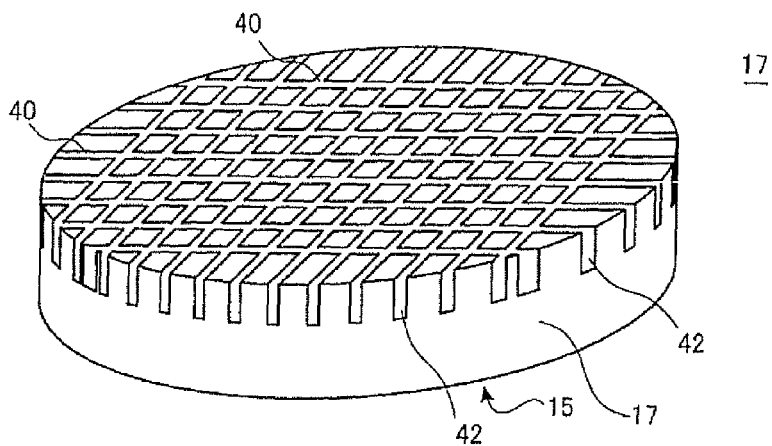
FIG. 16 is a schematic perspective view showing one sandwiching portion in another embodiment of the joining jig of the present invention in a state in which a sandwiching face is a lower face.
Figure 17:
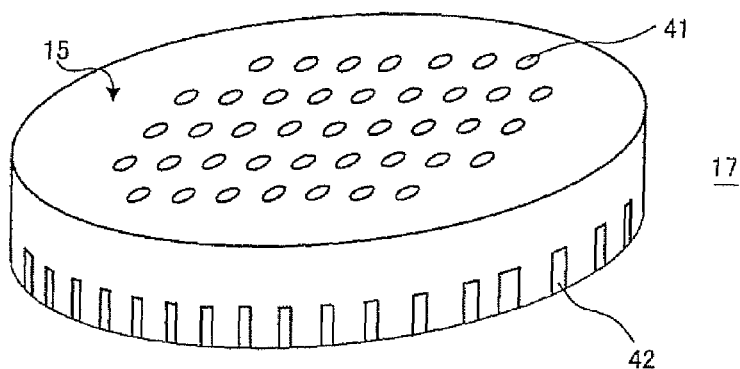
FIG. 17 is a schematic perspective view showing one sandwiching portion in another embodiment of the joining jig of the present invention in a state in which the sandwiching face is an upper face.

Moreover, there is not any special restriction on the shape of the outer periphery of the joining jig of the present invention, and the shape can appropriately be changed in accordance with the shape of a member to be joined. For example, to join a bonded body of different members as a die for forming, for example, a cylindrical honeycomb structure shown in FIG. 28, a disc-like joining jig is preferably used. As an example, FIG. 16 shows a schematic perspective view showing one sandwiching portion 17 in another embodiment of the joining jig of the present invention in a state in which a sandwiching face 15 is a lower face. FIG. 17 is a schematic perspective view showing the sandwiching portion 17 of the joining jig in a state in which the sandwiching face 15 is an upper face.

Figure 18:
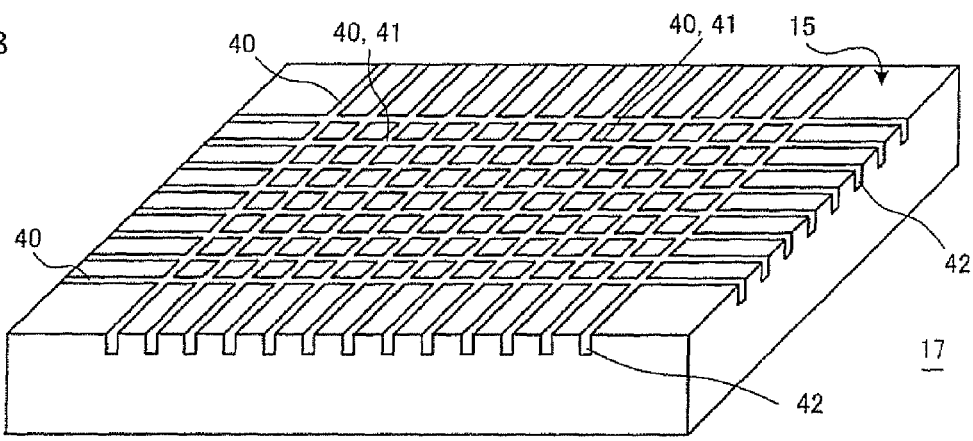
FIG. 18 is a schematic perspective view showing one sandwiching portion in a further embodiment of the joining jig of the present invention in a state in which a sandwiching face is an upper face.
Figure 19:
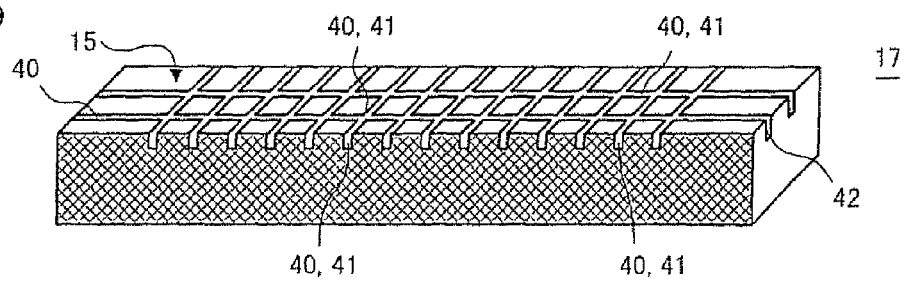
FIG. 19 is a partially cut perspective view schematically showing the one sandwiching portion in the further embodiment of the joining jig of the present invention in a state in which the sandwiching face is an upper face.

The vapor flow paths which also serve as the vapor inflow ports provided in the sandwiching portion of the joining jig of the present invention may be provided in the sandwiching face. For example, FIG. 18 is a schematic perspective view showing one sandwiching portion in a further embodiment of the joining jig of the present invention in a state in which a sandwiching face is an upper face. FIG. 19 is a partially cut perspective view schematically showing the one sandwiching portion in the further embodiment of the joining jig of the present invention in a state in which the sandwiching face is an upper face. Moreover, FIG. 9 is an explanatory view of a method for manufacturing the bonded body of different members by using further embodiment of the joining jig of the present invention, and is a schematic sectional view vertical to the surface of the plate member laminate viewed from the side of the plate member laminate sandwiched between sandwiching portions.

Figure 9:
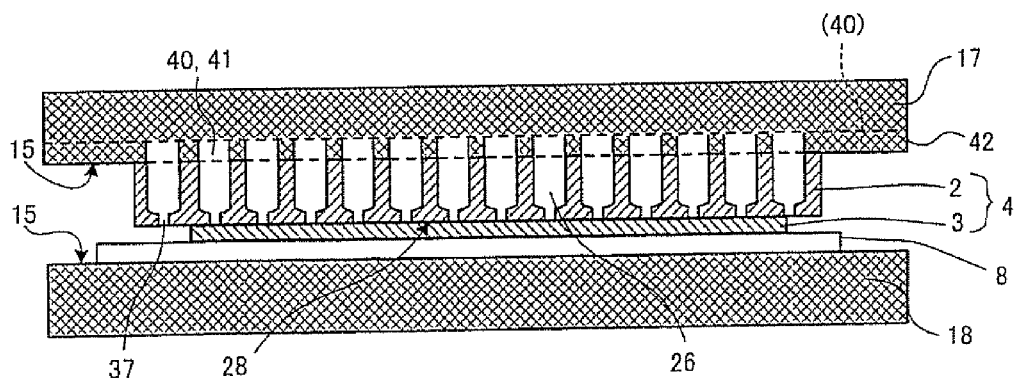
FIG. 9 is an explanatory view of the method for manufacturing the bonded body of different members by using another embodiment of the joining jig of the present invention, and is a schematic sectional view vertical to the surface of the plate member laminate viewed from the side of the plate member laminate sandwiched between sandwiching portions.

When the joining jig including a sandwiching portion 17 shown in FIGS. 18, 19 is used and a plate member laminate 4 is sandwiched as shown in FIG. 9, in a portion of the sandwiching portion which comes in contact with back holes 26, vapor flow paths 40 also serve as vapor inflow ports 41. When the groove-like vapor flow paths 40 are simply provided in the surface of the sandwiching portion 17, a labor for processing the vapor inflow ports 41 can be omitted, and a joining jig manufacturing cost can be lowered. Moreover, the vertical vapor flow paths 40 shown in FIG. 14 do not have to be provided in the sandwiching portion 17. Therefore, it is possible to prevent the lowering of the thermal conductivity in a case where hollows of the vertical vapor flow paths 40 are provided.

In a case where the groove-like vapor flow paths 40 which also serve as the vapor inflow ports 41 are provided in the sandwiching face as shown in FIGS. 18, 19, in a region around the center of the sandwiching face, which also serves as the vapor inflow port 41, it is preferable to set the sizes of the vapor flow paths 40 to a depth range of 0.05 to 50 mm, a width range of 0.05 to 50 mm and an interval range of 0.05 to 50 mm because the vapor of the solder can efficiently be discharged and additionally from the viewpoint of the thermal conduction efficiency during the heating or from the viewpoint that the joined face can more equally be pressurized when pressurized in the arrow directions shown in FIG. 4.

Moreover, hereinafter, a method for manufacturing a bonded body of different members according to the present embodiment will be described. The method for manufacturing the bonded body of different members of the present embodiment includes the steps of: sandwiching the plate member laminate between the sandwiching faces of the joining jigs described above in the present embodiment so that the plurality of back holes communicate with at least a part of the plurality of vapor inflow ports; heating the plate member laminate to a temperature at which the solder melts or a higher temperature; decreasing the pressure of a heating atmosphere to a pressure lower than the vapor pressure of the solder to allow the surplus solder vapor on the joined face to flow into the vapor inflow ports from the back holes; and discharging the vapor from the vapor discharge ports through the vapor flow paths to obtain the bonded body of different members in which the two plate members are joined to each other.

Figure 21:
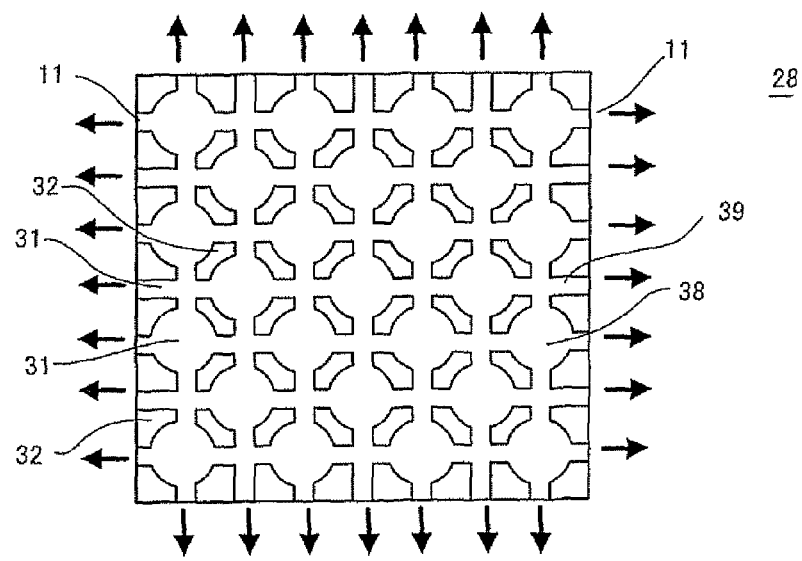
FIG. 21 is a schematic sectional view cut along the Y-Y' line of FIG. 2, showing the joined face of the bonded body of different members obtained according to the embodiment of the method for manufacturing the bonded body of different members of the present invention.

In the method for manufacturing the bonded body of different members of the present embodiment, as shown in FIG. 1, one plate member 2 of two plate members 2, 3 is provided with a plurality of groove portions 37 extending along the joined face 28 from the side surface of the plate member. Moreover, there are formed a plurality of openings 11 opened in the side surface of the plate member while communicating with the groove portions 37 as shown in FIG. 4, unjoined regions 31 formed of the back holes 26 or the groove portions 37 on the joined face 28 as shown in FIG. 21, and a plurality of joined regions 32 separated from one another by the unjoined regions 31 and joining the two plate members 2, 3 to each other. According to the present invention, the bonded body of different members having a complicated joined face including the joined regions and the unjoined regions can be manufactured in this manner.

Furthermore, in the method for manufacturing the bonded body of different members of the present embodiment, as shown in FIG. 4, the plate member laminate 4 sandwiched between a pair of joining jigs 5 via a sheet-like release material 8 is heated to a temperature at which the solder 27 melts or a higher temperature. Moreover, the pressure of the heating atmosphere is decreased to a pressure lower than the vapor pressure of the solder 27, and the surplus solder 27 in the unjoined regions 31 is discharged as the vapor from the openings 11. The openings 11 perform, to a certain degree, a function of discharging the vapor of the solder to the outside as shown by the arrows of FIG. 21.

To heat the plate member laminate 4 sandwiched between the pair of joining jigs 5, as shown in FIG. 5, the plate member laminate can be heated by heaters 7 or the like arranged around the joining jigs 5 sandwiching therebetween the plate member laminate 4 in an insulating container 16 disposed in a vacuum container 19 capable of decreasing the pressure of the heating atmosphere to the pressure lower than the vapor pressure of the solder 27.

Moreover, since the joining jig 5 is used in the heating step, the joining jig 5 made of a material having a melting point of 500° C. or more is preferably used. The material further have a melting point 1.5 times or more as high as the joining temperature of the plate members 2, 3 constituting the plate member laminate 4. When this joining jig 5 is used, the joining jig 5 can sufficiently pressurize the plate member laminate 4. After manufacturing the bonded body of different members, the joining jig 5 can easily be removed, and can repeatedly be used. Furthermore, thermal deformation of the joining jig 5 in the heating step can be suppressed.

It is to be noted that the joining temperature is a temperature at which the article is heated and thus joined, and the temperature is specifically a maximum temperature reached during the heating.

It is to be noted that there is not any special restriction on the melting point of the joining jig 5, but the melting point is further preferably 1000° C. or more, more preferably 1500° C. or more. When such a material is used, the plate member laminate can firmly be held in the heating step. Moreover, the joining jig 5 further preferably has a melting point twice or more as high as the above joining temperature.

There is not any special restriction on the specific material constituting the joining jig 5 as long as the material has a thermal conductivity (W/m$^2$·K) 1.5 times or more as large as that of at least one of the plate members 2, 3 constituting the plate member laminate 4. Preferable examples of the material include a material including at least one selected from the group consisting of silver, copper, gold, aluminum, magnesium, brass, tungsten, beryllium, iridium, molybdenum, silicon, carbon, aluminum nitride and silicon carbide.

Moreover, among the above materials, tungsten, molybdenum, carbon, aluminum nitride or the like can more preferably be used. Furthermore, carbon can especially preferably be used because the material is more inexpensive and has satisfactory processing properties.

It is to be noted that the thermal conductivity of the above-mentioned carbon, for example, isotropic graphite carbon noticeably changes in accordance with the density thereof. Therefore, when carbon is used as the material of the joining jig in the manufacturing method of the bonded body of different members of the present embodiment, the density is preferably 1.5 mg/m$^3$ or more, further preferably 1.7 mg/m$^3$ or more.

The carbon having such a density has a high thermal conductivity as compared with a material used in a conventional joining jig, and also has a remarkably high melting point, and hence the carbon can be used in the manufacturing method of the bonded body of different members using the plate members made of various materials.

The joining jig 5 having such a constitution has a remarkably satisfactory thermal conductivity, and can quickly be heated by radiant heat 10 of the heaters 7 or the like in the insulating container 16 as shown in FIG. 5.

Moreover, in a case where the plate member laminate 4 is sandwiched between the pair of joining jigs 5, as shown in FIG. 4, the plate member laminate 4 is preferably held in a state in which the sheet-like release material 8 is arranged between the joining jig 5 and the plate member laminate 4, and there is preferably no gap made between the joining jig 5 and the plate member laminate 4 so that the heat can more equally be conducted from the sandwiching face 15 of the joining jig 5 to the plate member laminate 4.

According to such a constitution, fusion bonding between the plate member laminate 4 (or a bonded body of different members 1 obtained (see FIG. 2)) and the sandwiching face 15 of the joining jig 5 can effectively be prevented, and close contact properties between the plate member laminate 4 and the joining jig 5 can be improved.

It is to be noted that the elasticity of the sheet-like release material 8 is preferably sufficiently small. Specifically, the elasticity is preferably 100 Gpa or less, further preferably 10 Gpa or less. According to such a constitution, a gap between the joining jig and the plate member can be filled, and the density and the thermal conductivity can be increased. Moreover, face pressure distribution can be made uniform.

It is to be noted that there is not any special restriction on the material of the release material 8, but a material having an excellent thermal conductivity is preferable. For example, a sheet-like material made of a material including at least one selected from the group consisting of silicon, carbon, aluminum nitride, aluminum oxide and silicon carbide is preferably usable. It is to be noted that the sheet-like release material preferably has a sufficiently small thickness. Specifically, the thickness is preferably 1 mm or less, further preferably 0.2 mm or less.

When the release material 8 is used, the close contact properties between the plate member laminate 4 and the joining jig 5 can further be improved, and the heat from the sandwiching face 15 of the sandwiching portions 5 can further equally be conducted to the surface of the plate member laminate 4.

Moreover, when the plate member laminate 4 is sandwiched between the joining jigs 5 in the manufacturing method of the bonded body of different members of the present embodiment, a pressure of, for example, 0.1 to 100 MPa is preferably applied to the sandwiched plate member in the arrow directions shown in FIG. 4 by a press machine or the like, although the pressure varies, depending on the type or the structure of the laminated plate members 2, 3. According to such a constitution, warpage generated after joining the two plate members 2, 3 to each other can be corrected to obtain the bonded body of different members 1 (see FIG. 2) which does not have any distortion.

Moreover, there is not any special restriction on the material of the two plate members 2, 3 constituting the plate member laminate 4 as shown in FIG. 1, but as the material of one (e.g., the plate member 2) of the two plate members 2, 3 is usable a material made of a metal or an alloy which can cause at least one phase transformation selected from the group consisting of martensite transformation, bainite transformation and pearlite transformation by the cooling of an austenite phase.

Furthermore, when the above material made of the metal or alloy is used as the one plate member 2 of the two plate members 2, 3, as the other plate member 3, a material made of a tungsten carbide group super hard alloy is preferably usable.

In a case where the two plate members 2, 3 described above are used, it is possible to especially manufacture the bonded body of different members 1 (see FIG. 2) from an only part of which an excellent wear resistance is demanded, for example, a die for use in extrusion-forming or the like.

Moreover, in the manufacturing method of the bonded body of different members of the present embodiment, when the plate members 2, 3 made of the heterogeneous materials are laminated to obtain the plate member laminate 4, as shown in FIG. 1, the two plate members 2, 3 between which the solder 27 is arranged are laminated, to obtain the plate member laminate 4 including the solder 27 arranged between the two plate members 2 and 3. According to such a constitution, the two plate members 2, 3 can easily be joined to each other, and a joining strength in the joined face 28 between the two plate members 2 and 3 improves.

It is to be noted that there is not any special restriction on the solder 27, but a material which can penetrate at least one of the two plate members 2, 3 is preferable as the solder. When the solder 27 made of such a material is used, the solder 27 does not exist in the form of the layer of the plate member laminate as it is in the joined face between the two plate members 2 and 3, and the lowering of the mechanical strength can effectively be prevented.

Preferable examples of the solder 27 for use in the manufacturing method of the bonded body of different members of the present embodiment include a solder including at least one selected from the group consisting of copper, silver, gold, nickel and aluminum.

Figure 23:
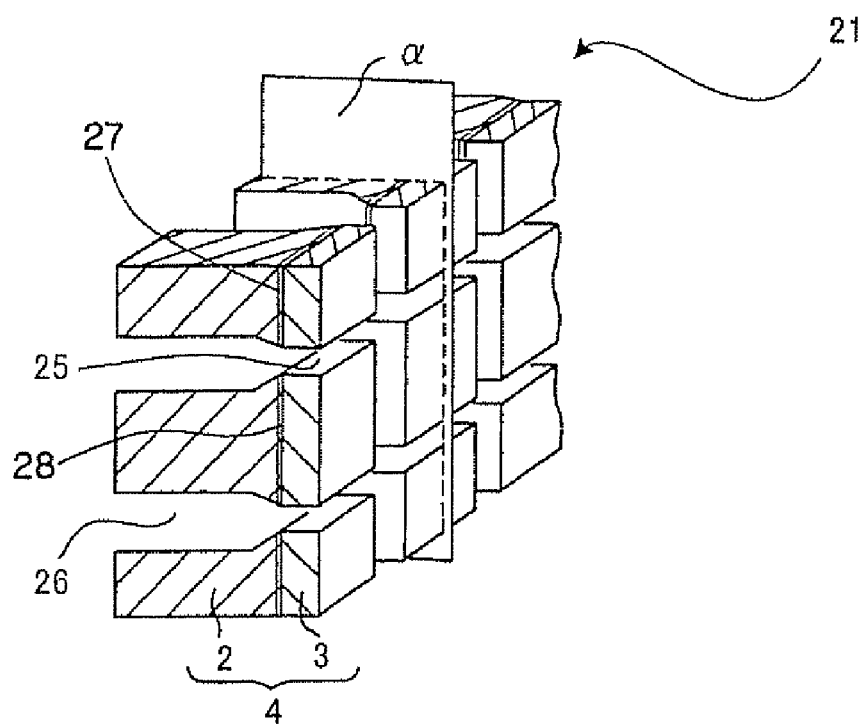
FIG. 23 is a schematic perspective view schematically showing the die for forming a honeycomb structure.
Figure 24:
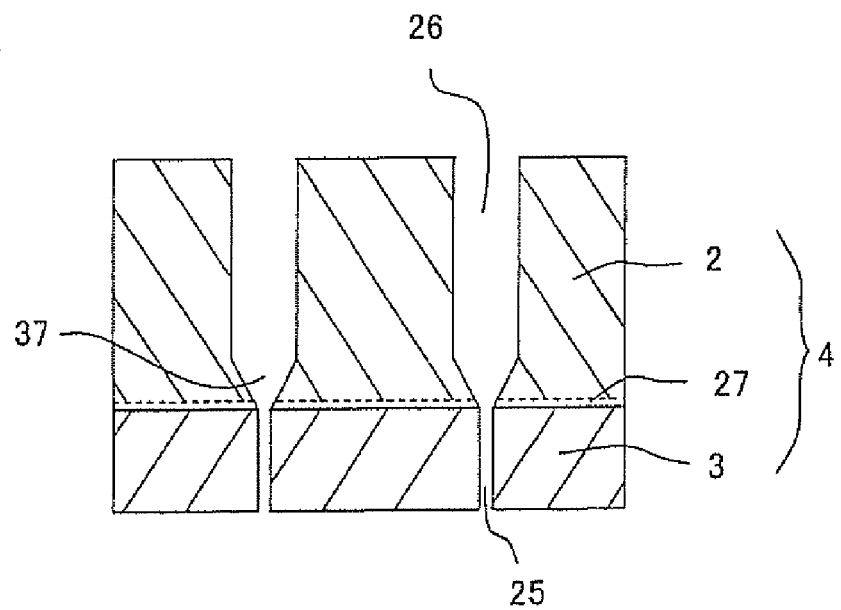
FIG. 24 is a schematic sectional view showing the section of the honeycomb structure forming die shown in FIG. 12, cut along a plane α.

Moreover, in the manufacturing method of the bonded body of different members of the present embodiment, as shown in, for example, FIG. 3, the one plate member 2 constituting the bonded body of different members is provided with the groove portions 37 communicating with the back holes 26 as introduction holes of a kneaded forming clay and provided along the joined face in the lattice-like shape. Moreover, the other plate member 3 constituting the bonded body of different members is provided with slits 25 for forming the forming material into the lattice-like shape, whereby a die 21 for forming a honeycomb structure as the bonded body of different members as shown in FIG. 23 can be manufactured. FIG. 24 is a schematic sectional view of the structure cut along the plane a of FIG. 23. The forming materials introduced from the adjacent back holes 26 join each other at the groove portion 37, a flow rate is regulated, and the other plate member 3 joined by the solder 27 in the joined face 28 is provided with the slits 25 in positions corresponding to the groove portions 37. A formed article having a desired honeycomb shape can be formed from the slits 25.

Figure 20:
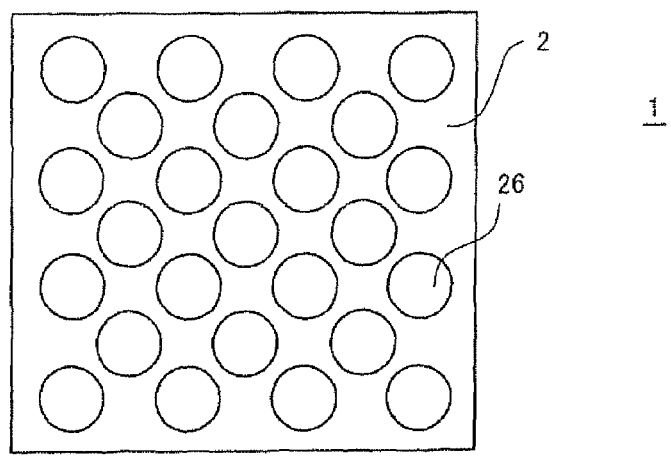
FIG. 20 is a schematic sectional view cut along the X-X' line of FIG. 2, showing a bonded body of different members obtained according to one embodiment of a method for manufacturing the bonded body of different members of the present invention.

FIGS. 20 and 21 show a schematic sectional view cut along the X-X' line of FIG. 2, and a schematic sectional view cut along the Y-Y' line of FIG. 2. The back holes 26 regularly arranged as shown in FIG. 20 function as the introduction holes of the forming material, the adjacent back holes communicate with each other in the groove portion 37, and the flow rate of the forming material is equalized. Moreover, in the joined face 28 shown in FIG. 21, the groove portions 37 are formed over the whole outer periphery as the side surface of the bonded body of different members to provide the openings 11, and the vapor of the solder can be discharged through the openings 11 as shown by the arrows of the drawing during the heating. According to the manufacturing method of the bonded body of different members of the present embodiment, even when the minimum value of the area of each joined region 32 is in a range of 0.1 to 100 mm² and the joined face has a complicated shape as shown in FIG. 21, the heterogeneous materials can precisely be joined together with a sufficient strength.

Figure 27:
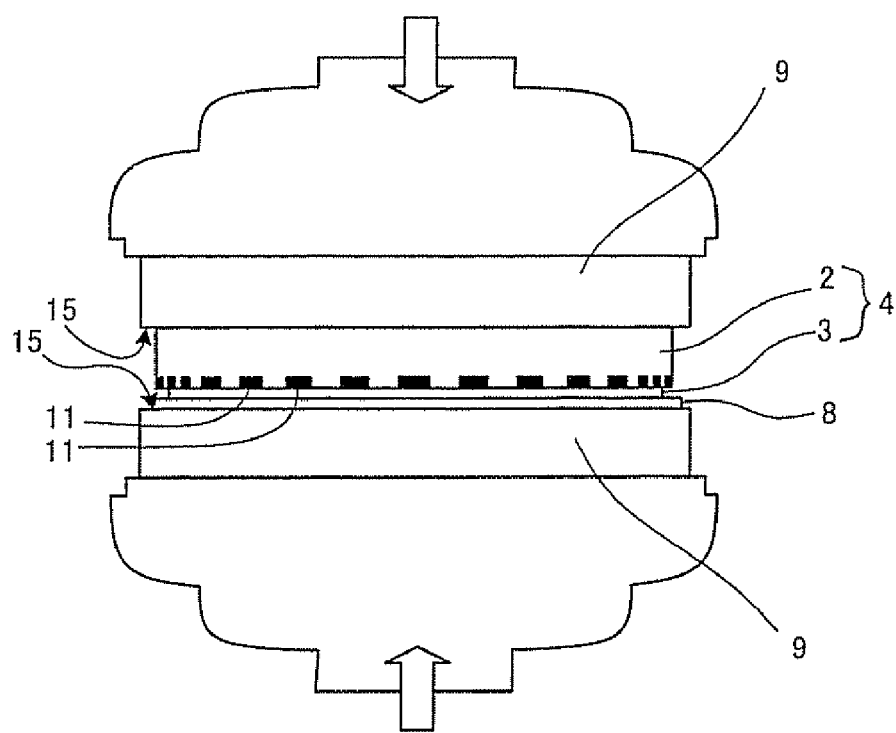
FIG. 27 is a schematic explanatory view schematically showing that the plate member laminate is sandwiched between the joining jigs in one example of a conventional method for forming the bonded body of different members.
Figure 28:
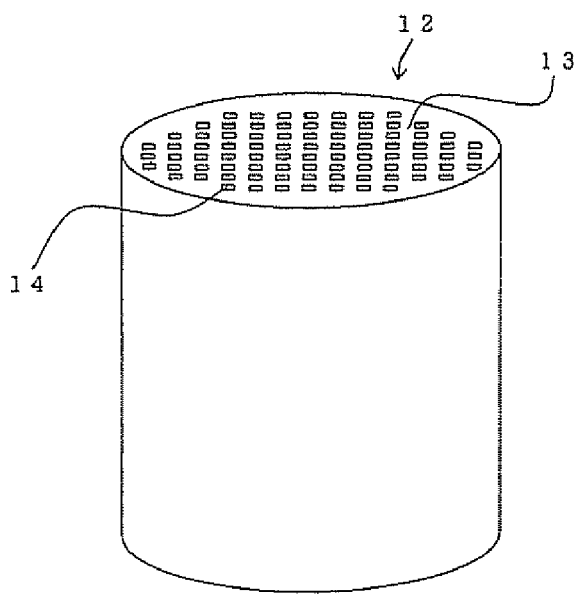
FIG. 28 is a perspective view schematically showing a honeycomb structure extrusion-formed by the die shown in FIG. 3.

In the conventional manufacturing method of the bonded body of different members, as shown in FIG. 27, the vapor of the solder is discharged only through openings 11, which causes a problem that the vapor of the solder cannot sufficiently be discharged. As to a honeycomb structure having cells 14 separated from one another by partition walls 13 as shown in FIG. 28, in recent years, lightening, the thinning of the partition walls 13, a densified cell density and the like have been demanded to cope with a strict environmental standard. To meet this requirement, the sizes and intervals of the back holes or the groove portions provided in the one plate member are decreased, and hence miniaturization and densification are demanded for both the unjoined region and the joined region more than ever as shown in the joined face 28 of the plate member laminate of FIG. 21. It is difficult to realize such accurate joining as to satisfy sufficient strength and durability.

To solve the problem, in the manufacturing method of the bonded body of different members of the present embodiment, there is used a joining jig including, as shown in, for example, FIG. 7, a pair of flat-plate sandwiching portions 17, 18 having the sandwiching faces 15 for sandwiching therebetween the plate member laminate 4 in which the two plate members 2, 3 are laminated while the solder is arranged on the joined face 28 between the plate members. The joining jig has the plurality of vapor inflow ports 41 provided in the sandwiching face 15 so that the surplus solder vapor on the joined face 28 flows into the vapor inflow ports in a case where the plate member laminate 4 is heated while the laminate is sandwiched between a pair of sandwiching portions 17 and 18; the vapor flow paths 40 provided so that the vapor flow paths communicate with the vapor inflow ports 41 to form the flow paths of the vapor of the solder; and the vapor discharge ports 42 provided in the side surface of the joining jig so that the vapor discharge ports communicate with the vapor flow paths 40 to discharge the vapor of the solder to the outside. In consequence, various problems accompanying the remaining vapor of the solder can be prevented.

Figure 22:
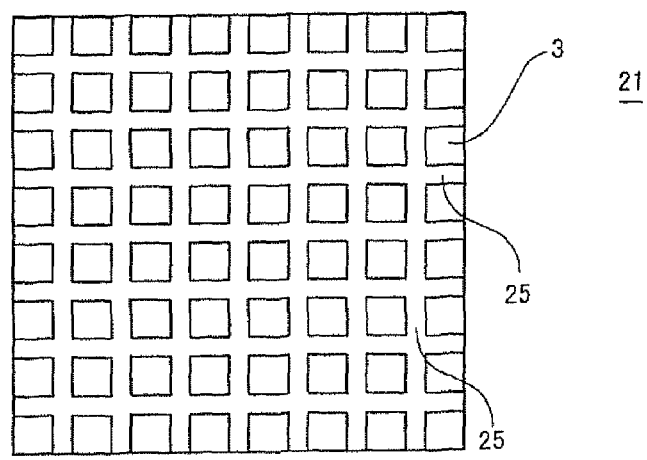
FIG. 22 is a schematic sectional view cut along the Z-Z' line of FIG. 3, showing a die, and is an explanatory view schematically showing a step of forming slits in the other plate member in the embodiment of the method for manufacturing the bonded body of different members of the present invention.

In the joined face 28, unjoined regions 38, 39 of FIG. 21 corresponding to the back holes 26 and the groove portions 37 communicate with the openings 11. The plurality of the joined regions 32 having an accurate and complicated shape and separated from one another by the back holes 26 or the groove portions 37 are joined with a sufficient strength owing to the penetrating function of the solder. The slits 25 provided in the other plate member 3 to be joined at the plurality of joined regions 32 in the joined face 28 are shown in FIG. 22 as a schematic sectional view cut along the Z-Z' line of FIG. 3. The slits 25 are provided in positions corresponding to the groove portions 37, and the width of each slit 25 is adjusted to a desired width in accordance with a forming application, so that the bonded body of different members can be used as the forming die 21.

In the manufacturing method of the bonded body of different members as a conventional honeycomb structure forming die, in a case where the one plate member 2 and the other plate member 3 are heated to a temperature at which the solder (e.g., pure copper) melts or a higher temperature, and are bonded to each other, the solder (pure copper) is melted, and the pressure of the heating atmosphere is decreased to a pressure lower than the vapor pressure of the solder 27, to vaporize and remove the solder 27 entering the back holes 26 during the joining. However, a part of the solder 27 enters the back holes 26 and the groove portions 37 formed in the one plate member, and remains in the back holes 26 and the groove portions 37. When the solder 27 remains in the back holes 26 and the groove portions 37 and the slits 25 (see FIG. 3) are formed to extend through the other plate member 3, this solder 27 constitutes a resistor to cause distortion in the formed slits 25 or sometimes break a tool such as a grindstone for forming the slits 25. Moreover, when the solder 27 remains in the back holes 26, the flow paths connecting the back holes 26 to the slits 25 of the bonded body of different members 1 are closed or narrowed, which causes a problem that the quality of the formed article is adversely affected. Moreover, in recent years, with the increase of the bore diameter of the honeycomb structure or the high densification of partition walls, the joined region and the unjoined region of the joined face are both densified, and a demanded precision rises. In a case where the vapor of the solder is not sufficiently discharged from this unjoined region in the joined face, even when an only slight amount of the vapor remains, the influence of the vapor cannot be ignored.

In the manufacturing method of the bonded body of different members as the honeycomb structure forming die of the present embodiment, as shown in FIG. 7, the plate member laminate is sandwiched using the joining jig constituted of a pair of flat-plate sandwiching portions 17, 18 including the sandwiching faces 15 which sandwich therebetween the plate member laminate 4 in which the two plate members 2, 3 are laminated while the solder is arranged on the joined face 28 between the two plate members. The one plate member 2 of the plate member laminate 4 is provided with the plurality of back holes 26 which connect the joined face 28 to the plurality of vapor inflow ports 41. As shown in FIG. 5, the plate member laminate 4 is heated while the laminate is sandwiched between the pair of sandwiching portions 5 in the insulating container 16 disposed in the vacuum container 19. Moreover, the solder (copper) is melted, and the pressure of the heating atmosphere is decreased to the pressure lower than the vapor pressure of the solder 27.

At this time, the surplus solder vapor on the joined face 28 shown in FIG. 7 is allowed to flow into the vapor inflow ports 41 from the plurality of back holes 26, and discharged from the plurality of vapor discharge ports 42 through the vapor flow paths 40 to join the two plate members 2, 3 to each other, thereby obtaining the bonded body of different members 1 shown in FIG. 2. Furthermore, as shown in FIG. 3, the other plate member 3 constituting the bonded body of different members 1 is provided with the lattice-like slits 25 for forming the forming material into the lattice-like shape so that the slits communicate with the groove portions 37. In a case where the bonded body of different members in which the two plate members are joined to each other is manufactured as the die for forming the honeycomb structure in this manner, various problems accompanying the remaining solder vapor can be prevented.

As shown in FIG. 3, in a case where the other plate member 3 constituting a part of the die 21 is provided with the slits 25, the solder 27 entering the back holes 26 hardly constitutes the resistor, and the slits 25 which do not have any distortion or the like can accurately and simply be formed. Moreover, a product having a higher quality can be obtained.

The die 21 is the die 21 constituted of the bonded body of different members 1 in which the plate member 2 provided with the back holes 26 for introducing the forming material is joined to the plate member 3 provided with the slits 25 for forming this forming material into the lattice-like shape. FIG. 11 shows a section of the die 21 cut along the Z-Z' line of FIG. 3. As shown in FIG. 22, the slits 25 are formed in the lattice-like shape in the die 21. When the slits 25 are formed in this manner, the die can be used to extrusion-form a honeycomb structure 12 having a plurality of cells 14 constituting fluid flow paths separated from one another by porous partition walls 13 as shown in FIG. 28.

It is to be noted that the honeycomb structure 12 shown in FIG. 28 can preferably be used in a carrier for a catalyst using a catalytic function in an internal combustion engine, a boiler, a chemical reaction device, a fuel cell reformer or the like, a filter for collecting fine particles from an exhaust gas or the like.

To manufacture the die 21 shown in FIG. 23, first, as shown in, for example, FIG. 1, the one plate member 2 of the two plate members 2, 3 is provided with the back holes 26, and the plate member 2 provided with the back holes 26 and the other plate member 3 are laminated to obtain the plate member laminate 4.

The back holes 26 can be formed by a heretofore known method such as electrolytic processing (ECM processing), discharge processing (EDM processing), laser processing, or mechanical processing by a drill or the like.

The sizes of the opening diameters of the back holes 26 can appropriately be determined in accordance with the size of the honeycomb structure forming die 1 to be manufactured, the shape of the honeycomb structure 12 (see FIG. 28) to be extrusion-formed or the like, but the sizes of the opening diameters of the back holes 26 are in a range of preferably 10 to 0.1 mm, further preferably 3 to 0.5 mm. There is not any special restriction on a method of forming the back holes 26, but a heretofore known method such as the electrolytic processing (the ECM processing), the discharge processing (the EDM processing), the laser processing, or the mechanical processing by the drill or the like is preferably usable. However, the back holes are preferably provided in the one plate member 2 in advance as described above.

Moreover, as shown in FIG. 1, before or after forming the back holes 26 in the one plate member, the lattice-like groove portions 37 corresponding to the slit shape are formed in one surface of the one plate member. The lattice-like groove portions 37 function as buffer portions of the forming material introduced from the back holes 26. Therefore, the resultant honeycomb structure forming die can smoothly move the forming material introduced from the back holes without any trouble, and sophisticated forming properties are realized. Moreover, the honeycomb structure can precisely be formed.

Moreover, in a case where the lattice-like groove portions 37 are formed along the joined face in this manner and the other plate member constituting a part of a die base member is provided with slits by grind processing or the like, when the slits reach the lattice-like groove portions 37, the formation of the slits can be stopped, and the one plate member does not have to be subjected to extra processing. Therefore, the deterioration of the grindstone or the like for use in the processing can effectively be prevented. Furthermore, when the back holes and the groove portions are formed in advance, a thermal stress due to a difference between thermal expansion coefficients decreases. Therefore, when the one plate member is joined to the other plate member, peel of the joined face 28 can be decreased.

As a method of forming the lattice-like groove portions 37, a heretofore known method such as the grind processing by the diamond grindstone or the discharge processing (the EDM processing) is preferably usable. Moreover, the groove portions 37 preferably have depths in a range of 0.1 to 3.0 mm and widths in a range of 0.1 to 1.0 mm.

Next, as shown in FIG. 5, the resultant plate member laminate 4 sandwiched between the joining jigs 5 (the sandwiching portions 17 and 18) made of a material including carbon as a main component is heated in the insulating container 16 of the vacuum container 19 to melt the solder (copper), and the pressure of the heating atmosphere is decreased to the pressure lower than the vapor pressure of the solder 27. During the joining, the solder 27 entering the back holes 26 and the groove portions 37 are vaporized, and can be discharged from the vapor discharge ports 42 provided in the side surface of the sandwiching portion 17 from the back holes 26 through the vapor inflow ports provided in the sandwiching face 15 of the sandwiching portion 17 and the vapor flow paths provided in the sandwiching portion 17. Thus, the two plate members 2, 3 constituting the plate member laminate 4 are joined to each other.

Next, as shown in FIG. 3, the other plate member 3 is provided with the slits 25 for forming the forming material into the lattice-like shape, to manufacture the die 21 (the bonded body of different members 1) for forming the honeycomb structure. The slits 25 can be formed by a heretofore known method such as the grind processing by the diamond grindstone or the discharge processing (the EDM processing).

In particular, when the die 21 is manufactured in this manner, as the one plate member 2 is usable a material made of a metal or an alloy which can cause at least one phase transformation selected from the group consisting of martensite transformation, bainite transformation and pearlite transformation by the cooling of an austenite phase. Furthermore, as the other plate member 3, a material made of a tungsten carbide group super hard alloy is used. In consequence, the die 21 having an excellent wear resistance can be manufactured.

It is to be noted that the manufacturing method of the bonded body of different members of the present invention is a manufacturing method for manufacturing the bonded body of different members in which two plate members made of heterogeneous materials are joined to each other. However, needless to say, the method may preferably be used as the manufacturing method for manufacturing the bonded body of different members in which two plate members made of the same type of material are joined to each other. It is to be noted that to manufacture the plate member joined article made of the same type of material, the plate member joined article can be manufactured by a method similar to the above-mentioned manufacturing method of the bonded body of different members except that the two plate members made of the same type of material are used as members for use.

Example

Hereinafter, the present invention will specifically be described in accordance with examples, but the present invention is not limited to the following examples.

In the present example, a pair of joining jigs 5 shown in FIG. 8 were used. In this joining jig 5, one sandwiching portion 17 includes a mechanism for discharging, to the outside, vaporized surplus solder on a joined face during heating. As shown in FIG. 1, this joining jig is constituted of a pair of flat-plate sandwiching portions 5 including sandwiching faces 15 to, as shown in FIG. 4, sandwich a plate member laminate 4 in which two plate members 2, 3 are laminated while a solder 27 is arranged on a joined face 28 between the two plate members as shown in FIG. 1. The one sandwiching portion 17 had a disc-like shape as shown in FIGS. 16, 17 as a specific example.

This joining jig has a plurality of vapor inflow ports 41 provided in the sandwiching face 15 so that surplus solder vapor on a joined face 28 flows into the vapor inflow ports in a case where the plate member laminate 4 is heated while the laminate is sandwiched between the pair of sandwiching portions 5; vapor flow paths 40 provided so that the vapor flow paths communicate with the vapor inflow ports 41 to form the flow paths of the vapor of the solder; and vapor discharge ports 42 provided in the side surface of the joining jig so that the vapor discharge ports communicate with the vapor flow paths 40 to discharge the vapor of the solder to the outside. The size of this sandwiching portion 17 is as follows. The joining jig (the sandwiching portion) had a disc-like shape having a diameter of 240 mm and a thickness of 15 mm. The diameter of each vapor inflow port was set to 6 mm. The section of a lattice-like groove portion of each vapor flow path had a width of 3.0 mm and a depth of 3.0 mm. The vertical size of each vapor discharge port was set to 3.0 mm and the lateral size thereof was set to 3.0 mm. The number of the parts: 256 vapor inflow ports in total in a range of a circular region having a diameter of 180 mm inside a disc-like joining jig (a diameter of 240 mm), each lattice-like vapor flow path having a lattice interval of 10 mm.

Back holes for introducing a forming material were formed in one plate member, and lattice-like groove portions corresponding to the shape of each slip were formed on the surface of the one plate member as a joined face, by grind processing using a boron nitride grindstone. A solder was arranged on this joined face, and the one plate member and the other plate member were laminated to obtain a plate member laminate. Next, this plate member laminate was heated in a vacuum container while the laminate was sandwiched between pushing molds via a release material, to obtain a die base member. Then, the other plate member constituting a part of the resultant die base member was provided with slits communicating with the groove portions of the one plate member to manufacture a honeycomb structure forming die.

In the example, the honeycomb structure forming die was manufactured by using the one plate member made of SUS630 (C; 0.07 or less, Si; 1.00 or less, Mn; 1.00 or less, P; 0.040 or less, S; 0.030 or less, Ni; 3.00 to 5.00, Cr; 15.50 to 17.50, Cu; 3.00 to 5.00, Nb+Ta; 0.15 to 0.45, and Fe; a balance (unit is mass %), the other plate member made of a tungsten carbide super hard alloy of WC-16 mass % of Co, and a solder made of copper.

The one plate member having a disc-like shape with a diameter of 215 mm as a face size and a thickness of 15 mm was used. The other plate member having a disc-like shape with a diameter of 210 mm as a face size and a thickness of 2.5 mm was used. The solder having a disc-like shape with a diameter of 210 mm as a face size and a thickness of 0.010 mm was used. The sheet-like release material having a disc-like shape with a diameter of 240 mm as a face size and a thickness of 0.2 mm was used.

First, the one plate member was provided with the back holes each having an opening diameter of 1.14 mm in positions corresponding to intersections of the lattice-like slits formed later, by electrolytic processing (ECM processing). Furthermore, the lattice-like groove portions each having equal vertical and lateral widths of 0.3 mm and a depth of 0.5 mm were provided at an interval of 0.8 mm in positions corresponding to the slits of the surface as the joined face, to connect the back holes to the openings in the side surface.

Next, the one plate member and the other plate member were laminated while the solder was arranged between the plate members, and the plate members were sandwiched between a pair of joining jigs via the release material. Subsequently, the solder (copper) melted, and a pressure was decreased to a pressure lower than the vapor pressure of this solder during heating. While surplus solder vapor on the joined face was discharged from vapor discharge ports provided in the joining jig to the outside, the one plate member was joined to the other plate member to obtain a die base member. Specific heating conditions were set to a heating temperature of 1120° C. and a pressure of 0.133 Pa or less.

After lowering the temperature of the resultant die base member to normal temperature, the other plate member was provided with the slits communicating with the back holes of the one plate member to obtain the honeycomb structure forming die. The slits were formed into a quadrangular lattice-like shape by use of the diamond grindstone. The width of each slit was set to about 100 μm, the depth thereof was set to about 2.5 mm, and an interval between the adjacent slits was set to about 1000 μm.

The solder which had entered unjoined regions such as the back holes and the groove portions of a heterogeneous member laminate was vaporized during the heating, fed from the vapor inflow ports provided in the sandwiching face of one sandwiching portion through the vapor flow paths in the sandwiching portion, and discharged to the outside from the vapor discharge ports provided in the side surface. Therefore, in a case where the slits were formed in the other plate member, the solder did not constitute a resistor, and the slits which were not distorted could correctly and simply be formed. Moreover, any solder did not remain in the back holes of the resultant honeycomb structure forming die, and the widths of the slits were made uniform, so that a honeycomb structure having a high quality could be formed. Furthermore, in the resultant honeycomb structure forming die, the lattice-like groove portions functioned as buffer portions, and hence the forming material introduced from the back holes could smoothly be moved without any trouble. In consequence, sophisticated forming properties were realized, and the honeycomb structure was precisely formed.

Comparative Example

A honeycomb structure forming die was manufactured by using materials similar to those of the above example in the same manner as in the example except that as shown in FIG. 6, a plate member laminate 4 was heated and joined while the laminate was sandwiched between sandwiching portions 17 and 18 (see FIG. 6) of a conventional joining jig 9 which did not include any mechanism for discharging the vapor of a solder as shown in FIG. 27, to obtain a die base member.

In the manufacturing method of the honeycomb structure forming die of the present comparative example, after completing the heating, the solder remained in back holes and groove portions of one plate member. Therefore, a large resistance was generated during the processing of slits, and the slits having an equal width could not be formed. Moreover, in the resultant honeycomb structure forming die, the groove portions connecting the back holes to the slits, the flow paths of the back holes or the like had portions narrowed by the solder, and defects or the like were sometimes generated in a formed article.

Figure 25:
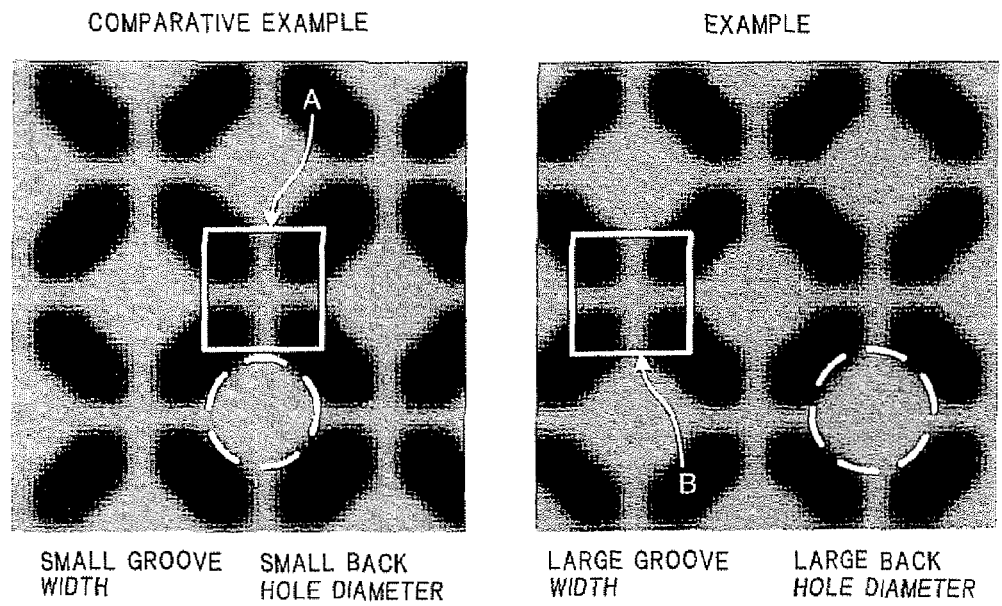
FIG. 25 show comparative photographs of an analysis result of an ultrasonic flaw detection test indicating whether or not the joining of the joined face of the die for forming the honeycomb structure is satisfactory in a comparative example and an example.
Figure 26:
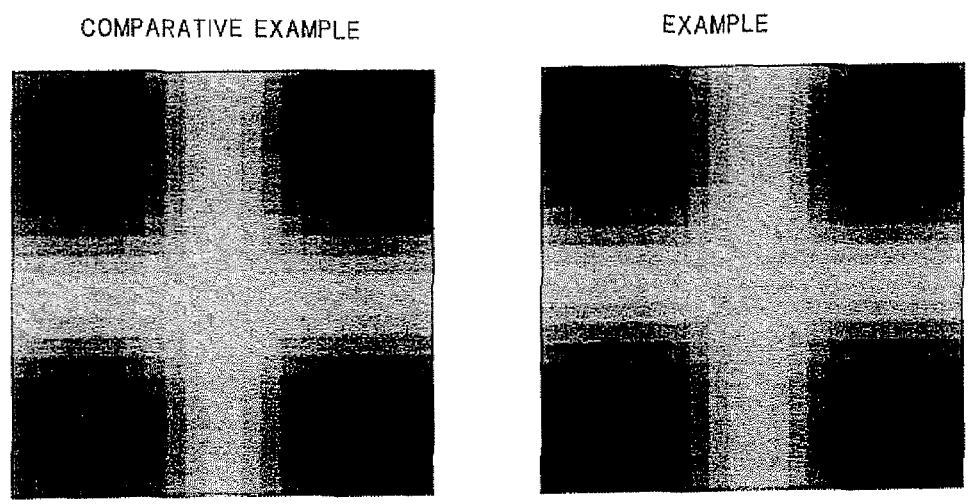
FIG. 26 show partially enlarged comparative photographs of regions A and B of FIG. 25 showing the analysis result of the ultrasonic flaw detection test indicating whether or not the joining of the joined face of the die for forming the honeycomb structure is satisfactory in the comparative example and the example.

It is to be noted that the removal of the solder which had entered the back holes and the groove portions of the one plate member was confirmed by an ultrasonic flaw detection test. FIG. 25 shows an analysis result of the ultrasonic flaw detection test indicating whether or not the joining of the joined face of the die for forming the honeycomb structure is satisfactory in the comparative example and the example. Moreover, FIG. 26 shows comparative photographs of a region A of the comparative example and a region B of the example shown in FIG. 25. In the drawings, joined regions were shown in black, and unjoined regions were shown in gray. It was indicated that in the example, the unjoined region was not closed with the solder and that in the comparative example, regions corresponding to the groove portions and the back holes were narrowed by the solder (black portions of the comparative photographs).

The manufacturing method of the bonded body of different members of the present invention can preferably be used as a method for manufacturing a bonded body of different members in which two plate members made of heterogeneous materials were joined to each other, especially as a bonded body of different members manufacturing method capable of precisely obtaining an accurate bonded body of different members from an only part of which an excellent wear resistance is demanded and in which an unjoined region and a joined region in a joined face are intricately intertwined.

What is claimed is:

1. A joining jig comprising:
   a pair of flat-plate sandwiching portions including sandwiching faces which sandwich a plate member laminate body which is joined;
   a plurality of vapor inflow ports provided on a sandwiching face of a first flat-plate sandwiching portion so that the plurality of vapor inflow ports receive a surplus vapor of solder generated by heating the plate member laminate body;
   a plurality of vapor flow paths provided inside the first flat-plate sandwiching portion and on an upper face of the first flat-plate sandwiching portion that is opposite the sandwiching face so that the vapor flow paths communicate with the vapor inflow ports to constitute flow paths of the surplus vapor of the solder; and
   a plurality of vapor discharge ports provided on a side surface of the first flat-plate sandwiching portion so that the vapor discharge ports communicate with the vapor flow paths to discharge the surplus vapor of the solder to the outside, wherein
   the plurality of vapor flow paths provided on the upper face form channels in the upper face that terminate at the vapor discharge ports, and
   the vapor discharge ports are adjacent to the upper face and do not extend to the sandwiching face.

2. The joining jig according to claim 1, wherein the vapor flow paths are provided so as to connect the adjacent vapor inflow ports to each other.

3. The joining jig according to claim 1, wherein the plurality of vapor discharge ports are provided at intervals over a partial periphery of the side surface.

4. The joining jig according to claim 1, wherein at least a part of the vapor flow paths are provided in a lattice-like shape in parallel with the sandwiching face.

5. The joining jig according to claim 1, wherein the vapor flow paths have widths of 0.05 to 50 mm and depths of 0.05 to 50 mm.

6. The joining jig according to claim 1, wherein when the plate member laminate is sandwiched between the pair of sandwiching portions, one of the plate members has a plurality of back holes connecting a joined face of the one plate member to the plurality of vapor inflow ports, and
   in a case where the plate member laminate is heated while the plate member laminate is sandwiched between the pair of sandwiching portions, the surplus solder vapor on the joined face is allowed to flow into the vapor inflow ports from the plurality of back holes, and is discharged from the plurality of vapor discharge ports through the vapor flow paths to obtain a bonded body of different plate members in which the plate members are joined to each other.

7. The joining jig according to claim 6, wherein the pair of sandwiching portions are made of a material having a thermal conductivity (W/m$^2$·K) 1.5 times or more as large as that of the one plate member.

8. A manufacturing method of a bonded body of different plate members, comprising the steps of:
- sandwiching the plate member laminate between the sandwiching faces of the joining jig according to claim 6 so that the plurality of back holes communicate with at least a part of the plurality of vapor inflow ports;
- heating the plate member laminate to a temperature at which the solder melts or a higher temperature;
- decreasing the pressure of a heating atmosphere to a pressure lower than the vapor pressure of the solder to allow the surplus solder vapor on the joined face to flow into the vapor inflow ports from the back holes; and
- discharging the vapor from the vapor discharge ports through the vapor flow paths to obtain the bonded body of different plate members in which the plate members are joined to each other.

9. A manufacturing method of a bonded body of different plate members, comprising the steps of:
- sandwiching the plate member laminate between the sandwiching faces of the joining jig according to claim 7 so that the plurality of back holes communicate with at least a part of the plurality of vapor inflow ports;
- heating the plate member laminate to a temperature at which the solder melts or a higher temperature;
- decreasing the pressure of a heating atmosphere to a pressure lower than the vapor pressure of the solder to allow the surplus solder vapor on the joined face to flow into the vapor inflow ports from the back holes; and
- discharging the vapor from the vapor discharge ports through the vapor flow paths to obtain the bonded body of different plate members in which the plate members are joined to each other.

10. The manufacturing method of the bonded body of different plate members according to claim 8, wherein the one plate member constituting the bonded body of different members has groove portions communicating with the back holes as introduction holes of a kneaded forming clay and provided along the joined face in a lattice-like shape,
- another plate member constituting the bonded body of different plate members is provided with slits to form a forming material into a lattice-like shape, the slits being formed into a lattice-like shape so as to communicate with the groove portions, and
- the bonded body of different plate members in which the plate members are joined to each other is manufactured as a die to form a honeycomb structure.

* * * * *